United States Patent
Lat et al.

(10) Patent No.: US 8,562,268 B2
(45) Date of Patent: Oct. 22, 2013

(54) FASTENER TIP COATING CHEMISTRY

(75) Inventors: Geronimo E. Lat, Ivanhoe, IL (US); Lawrence S. Shelton, Morton Grove, IL (US); Daniel P. Birr, Crystal Lake, IL (US); Arthur C. Wachowski, Huntley, IL (US); Daniel V. Chin, St. Charles, IL (US)

(73) Assignee: Illinois Tool Works Inc., Glenview, IL (US)

( * ) Notice: Subject to any disclaimer, the term of this patent is extended or adjusted under 35 U.S.C. 154(b) by 407 days.

(21) Appl. No.: 12/760,322

(22) Filed: Apr. 14, 2010

(65) Prior Publication Data

US 2010/0266367 A1    Oct. 21, 2010

Related U.S. Application Data

(60) Provisional application No. 61/170,366, filed on Apr. 17, 2009.

(51) Int. Cl.
*F16B 15/00* (2006.01)

(52) U.S. Cl.
USPC .......................................... 411/487; 508/126

(58) Field of Classification Search
USPC ................. 411/487, 903; 508/115, 126
See application file for complete search history.

(56) References Cited

U.S. PATENT DOCUMENTS

| | | | |
|---|---|---|---|
| 3,639,137 A | | 2/1972 | Marinelli |
| 3,813,985 A | * | 6/1974 | Perkins .......................... 411/442 |
| 3,856,686 A | * | 12/1974 | Sato et al. ...................... 508/112 |
| 3,869,393 A | * | 3/1975 | Booker .......................... 508/167 |
| 3,893,496 A | | 7/1975 | Wallace et al. |
| 4,252,658 A | * | 2/1981 | Tasaka et al. .................. 508/131 |
| 5,091,268 A | * | 2/1992 | Nishikawa et al. ......... 428/843.4 |
| 5,178,903 A | * | 1/1993 | Lat et al. ........................ 427/446 |
| 5,260,100 A | * | 11/1993 | Day ............................... 427/386 |
| 5,482,637 A | * | 1/1996 | Rao et al. ....................... 508/100 |
| 5,547,503 A | * | 8/1996 | Oldiges et al. ............ 106/287.18 |
| 5,603,818 A | | 2/1997 | Brent et al. |
| 5,733,085 A | | 3/1998 | Shida et al. |
| 5,741,104 A | | 4/1998 | Lat et al. |
| 5,749,692 A | * | 5/1998 | Kish et al. ...................... 411/453 |
| 5,960,555 A | * | 10/1999 | Deaton et al. ...................... 34/58 |
| 6,331,509 B1 | * | 12/2001 | Heimann et al. .............. 508/136 |
| 6,436,474 B2 | * | 8/2002 | Godsted et al. ............... 427/318 |
| 6,672,498 B2 | * | 1/2004 | White et al. ................... 227/120 |
| 6,689,721 B2 | * | 2/2004 | Denpo et al. .................. 508/100 |
| 6,696,392 B2 | * | 2/2004 | Naik et al. ..................... 508/121 |
| 6,960,555 B2 | * | 11/2005 | Anthony et al. .............. 508/136 |
| 7,273,337 B2 | * | 9/2007 | Lat et al. ........................ 411/443 |
| 7,360,798 B2 | * | 4/2008 | Matsumoto et al. ............ 285/94 |
| 7,395,925 B2 | | 7/2008 | Sutt, Jr. |
| 8,082,899 B2 | * | 12/2011 | Kuroda et al. .............. 123/193.6 |
| 2005/0187115 A1 | * | 8/2005 | Anthony et al. .............. 508/136 |
| 2007/0027232 A1 | | 2/2007 | Walsh, Jr. et al. |
| 2007/0264102 A1 | | 11/2007 | Shelton et al. |
| 2010/0167968 A1 | * | 7/2010 | Pinel et al. ..................... 508/100 |

FOREIGN PATENT DOCUMENTS

| | | |
|---|---|---|
| DE | 1475098 B2 | 2/1971 |
| FR | 1486725 A | 6/1967 |
| WO | 2006/110756 A1 | 10/2006 |

\* cited by examiner

*Primary Examiner* — Gary Estremsky

(74) *Attorney, Agent, or Firm* — Levenfeld Pearlstein, LLC

(57) ABSTRACT

An ease of drive coating for a fastener is formulated from a resin having at least two different friction reducing components, such as silicone and graphite. A fastener and fastener strip include a resin formulation with at last two different friction reducing components.

7 Claims, No Drawings

FASTENER TIP COATING CHEMISTRY

CROSS-REFERENCE TO RELATED APPLICATION

This application claims the benefit of priority of Provisional U.S. patent application Ser. No. 61/170,366, filed Apr. 17, 2009, entitled "FASTENER TIP COATING CHEMISTRY".

BACKGROUND OF THE INVENTION

The present invention relates to fastener coatings. More particularly, the present invention relates to chemistry for fastener tip coatings for ease of drive.

Powered drivers are used to drive fasteners in today's construction industries. In the home construction industry, use of engineered lumber, such as laminated veneer lumber (LVL), is on the rise. LVL is a very hard material and as such is a difficult material into which to power drive a fastener, such as a nail. Powered nailers (combustion, cordless, and the like) have to be sufficiently powerful to drive nails into these materials. This is exaggerated by the use of longer nails, which use is on the rise for improved construction quality and in order to meet building code requirements.

Coated fasteners (e.g., nails) are known and these coated nails do in fact provide ease of driving for powered nailers. However, the power required to drive nails is still high and in the case of cordless nailers, tool power is reduced with increased tool temperature which results in incomplete nail drive—that is, the nail remains standing above the surface of the substrate.

Accordingly, there is a need for a tip coating chemistry that further reduces the force needed to drive a fastener, such as a nail, into a substrate. Desirably, such a coating does not adversely effect the holding power of the fastener.

BRIEF SUMMARY OF THE INVENTION

An ease of drive coating for a fastener is formulated from a resin, such as an acrylic resin, preferably a number of (e.g., two) resins. A preferred coating is formulated from an amine salt of modified acrylic copolymers present in a concentration of about 0 percent to about 10.0 percent by weight of the coating, an ammonia salt of modified styrene acrylic polymers present in a concentration of about 15.0 percent to about 25.0 percent by weight of the coating and water present in a concentration of about 60.0 percent to about 70.0 percent by weight of the coating.

The coating includes at least two different friction reducing components. Two preferred components are silicone and graphite. In a present coating the silicone is present in a concentration of about 0.12 percent to about 2.8 percent by weight of the coating and the graphite is present in a concentration of about 0.5 percent to about 5.0 percent by weight of the coating.

The coating can further include one or more of solvents or coalescents, such as glycol ethers, present in a concentration of about 0 percent to about 10.0 percent by weight of the coating, surfactants present in a concentration of about 0 percent to about 5.0 percent by weight of the coating and a pigment present in a concentration of about 0 percent to about 5.0 percent by weight of the coating.

The coating can still further include primary or multi-functional amines, such as ammonium hydroxide, present in a concentration of about 0 percent to about 1.0 percent by weight of the coating and a rust inhibitor present in a concentration of about 0 percent to about 1.0 percent by weight of the coating. The coating can include a black pigment.

A coated fastener includes a fastener having a tip and a coating on the fastener, at least at the tip. A strip of collated fasteners includes a plurality of fasteners connected to one another by a strip, such as a tape strip or a plastic collation. The tape strip can be such as that disclosed in Shida, U.S. Pat. No. 5,733,085 and a plastic strip can be such as that disclosed in Shelton, Published U.S. Patent application, Publication No. US 2007-0264102, both of which are commonly assigned with the present application and are incorporated herein by reference. A coating is provided on each of the fasteners in the strip of fasteners, at least at the tip. A method for easing the drive of a fastener into a substrate includes coating the fastener, at least at the tip, with a coating formulated from an acrylic resin modified with at least two different friction reducing components.

These and other features and advantages of the present invention will be apparent from the following detailed description, in conjunction with the appended claims.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Various ease-of-drive nail coating formulations are known. These formulations all have the goal of reducing the force needed to drive a nail into a substrate while at the same time not adversely affecting the holding power of the nail.

One known nail coating that has been observed to be quite successful in reducing the force needed to drive nails is a resin, such as an acrylic resin formulation of an amine salt of modified acrylic copolymers present in a concentration of about 0 percent to about 10.0 percent by weight, an ammonia salt of modified styrene acrylic polymers present in a concentration of about 15.0 percent to about 25.0 percent by weight of the coating. Other suitable resins include polyurethane, polyester, alkyd, epoxy, phenolic, various amino, and vinyl or vinyl copolymers. The formulation further includes water present in a concentration of about 60.0 percent to about 70.0 percent by weight, solvents or coalescents, such as glycol ethers, present in a concentration of about 0 percent to about 10.0 percent by weight, surfactants present in a concentration of about 0 percent to about 5.0 percent by weight, a pigment, such as carbon black pigment, present in a concentration of about 0 percent to about 5.0 percent by weight, primary or multi-functional amines, such as ammonium hydroxide, present in a concentration of about 0 percent to about 1.0 percent by weight and a rust inhibitor present in a concentration of about 0 percent to about 1.0 percent by weight. Although a water-borne carrier is disclosed, it will be appreciated that a solvent-borne carrier can also be used. All percentage by weight are by weight of the coating.

The coating can be applied by dipping, spraying, brushing or other methods as will be recognized by those skilled in the art.

A present ease of drive coating includes the addition of graphite and silicone to the nail coating formulation. It has been found that this modified or enhanced coating significantly increases nail penetration compared to a standard (non-additive enhanced coating) when the nail is driven into LVL and other substrates. Various concentrations of graphite and silicone were investigated ranging from about 0 percent to about 10.0 percent and preferably 0.12 percent to about 2.8 percent and most preferred about 0.30 percent by weight (of the coating composition) of silicone and about 0 percent to about 5.0 percent and preferably 0.5 percent to about 5.0 percent and most preferred about 1.4 percent by weight (of the coating composition) of graphite. Graphite particle size preferred range is up to about 25 microns.

Nine samples of nails with a non-modified or non-enhanced coating and twenty two samples of nails (shown as two rows of 11 samples in TABLE 1) of each of five modified coatings were tested to determine the ease of drive of conventional 3¼ inch long×0.131 inch diameter nails. The modified coatings are identified as F-034, F-036, F-038, F-040 and F-042. The tests were conducted with the tool at about 180° F. (which is considered a "hot" tool). Testing was conducted using a PASLODE® CF325 cordless framing nailer to drive nails into two layer of LVL lumber. The test results are presented below in Table 1, below.

TABLE 1

STANDING HEIGHT OF NAILS IN 2 LAYERS OF LVL LUMBER
FOR VARIOUS GRAPHITE AND SILICONE CONCENTRATIONS

| Coating form. | Sample Number | | | | | | | | | | | |
|---|---|---|---|---|---|---|---|---|---|---|---|---|
| | 1 | 2 | 3 | 4 | 5 | 6 | 7 | 8 | 9 | 10 | 11 | AVG. |
| F-034 | 2 | 3 | 3.5 | 3.5 | 3 | 3.5 | 6.5 | 2.5 | 2 | 2 | 2 | |
| | 3.5 | 3.5 | 4 | 4 | 4 | 3.5 | 3 | 3.5 | 1 | 2.5 | 2.5 | 3.11 |
| F-036 | 3 | 10 | 9 | 5 | 4 | 3 | 8 | 8 | 1.5 | 0.5 | 1.5 | |
| | 3.5 | 14 | 6 | 6 | 11 | 5.5 | 10 | 2 | 1.5 | 1 | 1 | 5.23 |
| F-038 | 4 | 11 | 5.5 | 3.5 | 6.5 | 7 | 7.5 | 5.5 | 2 | 1.5 | 2 | |
| | 7 | 6 | 3 | 5 | 7.5 | 8.5 | 10 | 6.5 | 1.5 | 2 | 2.5 | 5.25 |
| F-040 | 6 | 5 | 5 | 4.5 | 9.5 | 5 | 11 | 6 | 2 | 1 | 2.5 | |
| | 7 | 4 | 6 | 6 | 3.5 | 4.5 | 12 | 8 | 1 | 0.5 | 5 | 5.23 |
| F-042 | 8.5 | 17 | 6.5 | 11 | 2 | 4.5 | 7.5 | 5 | 1 | 3 | 2.5 | |
| | 5 | 10 | 8 | 3.5 | 8 | 8 | 3 | 5 | 2 | 2 | 5 | 5.82 |
| Non-Enhanced | 13.7 | 15.8 | 12.0 | 12.5 | 17.5 | 15.0 | 11.5 | 11.1 | 13.0 | | | 13.6 |

The measurements shown above in Table 1 are the standing height, or the height of the nail head as measure in millimeters (mm) from the surface of the substrate, after being driven by the PASLODE® powered nailer. It will be appreciated that the height correlates to the difficulty of drive. That is, the greater the height, the more difficult it was to drive that nail. Conversely, of course, the smaller the height, the greater the ease of driving that nail.

The formulations (F-034 through F-042) represent identical resin compositions with varying concentrations of silicone and graphite. Table 2 below shows the various additive concentrations

TABLE 2

PERCENT BY WEIGHT OF THE COATING OF
SILICONE AND GRAPHITE ADDITIVE TO
STANDARD NAIL COATING COMPOSITION

| Formula | Percent by weight silicone | Percent by weight graphite |
|---|---|---|
| F-034 | 0.24 | 1.2 |
| F-036 | 0.24 | 0.5 |
| F-038 | 0.12 | 1.2 |
| F-040 | 0.06 | 0.5 |
| F-042 | 0.06 | 1.2 |

It is readily seen that there is a significant and substantial decrease in the standing height of the additive coated nail generally, and a more significant and substantial decrease with an additive composition of 0.24 percent silicone and 1.2 percent graphite. With this composition, the range of greatest standing heights was about 1.0 mm to a maximum of about 6.5 mm. This compares to a range of 0.5 mm to 14 mm for a coating additive composition of 0.24 percent silicone and 0.5 percent graphite and a range of 1.5 mm to 11 mm (with a clustering at about 5.0 to 7.5 mm) for a coating additive composition of 0.12 percent silicone and 1.2 percent graphite. The standard deviations for the various formulations F-034 to F-042 are 1.101, 3.851, 2.789, 3.027 and 3.766. As will be appreciated, the lower standard deviation represents a more consistent standing height (or drive) with a preferred formulation of about 0.24 percent silicone and 1.2 percent graphite.

It will be appreciated that the "hot" tool values are worst case values in that there are additional challenges faced by the use of "hot" tools due to the reduced efficiencies of higher temperatures. Accordingly, even less standing height values are anticipated with the use of a "cold" tool (e.g. temperatures at about 74° F.). It was also noted that, although data is not specifically provided, increasing the concentration of silicone to about 4.0 percent and graphite to about 20.0 percent resulted in decreased nail drive performance.

It should also be noted that withdrawal test results were not adversely effected by the additives. In fact, the withdrawal resistance (e.g., holding power) can be increased using the present coating by up to as much as 20 percent over conventional coated fasteners. This is quite surprising and the advantages not adversely effecting the withdrawal strength will be readily appreciated.

It will also be appreciated that although silicone and graphite are presented as the combined additives, other additives are also contemplated by the present invention, including, but not limited to Teflon, waxes such as paraffin, polyethylene, ethylene bis-stearamide (EBS), polytetrafluoroethylene (PTFE), micronized polyolefin, carnauba (organic and synthetic), boric acid, silica. Zinc stearate, fluorosurfactants, amorphos silicates, alumina silicates, magnesium silicates (talc), metallic stearates, molybdenum disulfide and the like.

All patents referred to herein, are incorporated herein by reference, whether or not specifically done so within the text of this disclosure.

In the disclosure, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present invention. It is to be understood that no limitation with respect to the specific embodiments presented is intended or should be inferred. The disclosure is intended to cover by the appended claims all such modifications as fall within the scope of the claims.

What is claimed is:

1. A coated fastener comprising:
   a fastener having a tip; and
   a coating on the fastener, at least at the tip, the coating formulated from a resin modified with at least two different friction reducing components,
   wherein the resin is an acrylic resin, and wherein the coating is a formulation of an amine salt of modified acrylic copolymers present in a concentration of about 0 percent to about 10.0 percent by weight of the coating, an ammonia salt of modified styrene acrylic polymers present in a concentration of about 15.0 percent to about 25.0 percent by weight of the coating, water present in a concentration of about 60.0 percent to about 70.0 percent by weight of the coating, one or more of glycol ethers present in a concentration of about 0 percent to about 10.0 percent by weight of the coating, surfactants present in a concentration of about 0 percent to about 5.0 percent by weight of the coating, a pigment present in a concentration of about 0 percent to about 5.0 percent by weight of the coating, ammonium hydroxide present in a concentration of about 0 percent to about 1.0 percent by weight of the coating and a rust inhibitor present in a concentration of about 0 percent to about 1.0 percent by weight of the coating.

2. The coated fastener in accordance with claim 1 wherein the pigment is a black pigment.

3. A coated fastener, comprising:
   a fastener having a tip; and
   a coating on the fastener, at least at the tip, the coating formulated from a resin modified with at least two different friction reducing components,
   wherein one of the friction reducing components is silicone, and wherein the other of the friction reducing components is graphite, and wherein the silicone is present in a concentration of about 0.12 percent to about 2.8 percent by weight of the coating and the graphite is present in a concentration of about 0.5 percent to about 5.0 percent by weight of the coating.

4. A coating for a fastener comprising:
   a resin modified with at least two different friction reducing components mixed with the resin, the resin being a formulation of an amine salt of modified acrylic copolymers present in a concentration of about 0 percent to about 10.0 percent by weight of the coating, an ammonia salt of modified styrene acrylic polymers present in a concentration of about 15.0 percent to about 25.0 percent by weight of the coating and water present in a concentration of about 60.0 percent to about 70.0 percent by weight of the coating,
   wherein one of the friction reducing components is silicone.

5. A coating for a fastener, comprising:
   a resin modified with at least two different friction reducing components, wherein one of the friction reducing components is silicone, and wherein the other of the friction reducing components is graphite, and wherein the silicone is present in a concentration of about 0.12 percent to about 2.8 percent by weight of the coating and the graphite is present in a concentration of about 0.5 percent to about 5.0 percent by weight of the coating.

6. The strip of collated fasteners in accordance with claim 5 wherein the resin is an acrylic resin.

7. A strip of collated fasteners, comprising:
   a plurality of fasteners connected to one another by a strip, each of the fasteners having a tip; and
   a coating on each of the fasteners in the strip of fasteners, at least at the tip, the coating formulated from a resin modified with at least two different friction reducing components,
   wherein one of the friction reducing components is graphite, and wherein the other of the friction reducing components is silicone, and wherein the silicone is present in a concentration of about 0.12 percent to about 2.8 percent by weight of the coating and the graphite is present in a concentration of about 0.5 percent to about 5.0 percent by weight of the coating.

* * * * *